March 27, 1951     W. VUTZ     2,546,531
HITCH MECHANISM

Filed May 10, 1949     2 Sheets-Sheet 1

INVENTOR.
Wilhelm Vutz.
BY
Alden L. Redfield.
ATTY.

March 27, 1951    W. VUTZ    2,546,531
HITCH MECHANISM
Filed May 10, 1949    2 Sheets-Sheet 2

INVENTOR.
Wilhelm Vutz.
BY
Alden S. Redfield.
ATTY.

Patented Mar. 27, 1951

2,546,531

UNITED STATES PATENT OFFICE 2,546,531

HITCH MECHANISM

Wilhelm Vutz, Coldwater, Ohio, assignor to Avco Manufacturing Corporation, Cincinnati, Ohio, a corporation of Delaware Application May 10, 1949, Serial No. 92,460

2 Claims. (Cl. 280—33.44)

This invention relates to lifts and hitches and is particularly applicable to a combined lift and hitch for connecting farm equipment to the draw bar of a tractor. The illustrative embodiment herein described will be directed to this environment. The invention has utility, however, in any circumstance where an unbalanced vehicle not having its own motive power is to be connected to another vehicle in tractor-trailer relationship.

Many types of farm equipment are not completely self-sustaining on their own chassis. Illustrations of this type of equipment are mowers, hay rakes, tractor-drawn manure spreaders, and portable elevators where the main running weight of the device is carried by two wheels but additional support is derived from the draw bar of the tractor.

With elevators which may be as long as fifty or more feet in length, the end to be attached to the tractor when the device is to be moved from one position to another normally rests upon the ground. Such elevators may weigh 1500 pounds or more and only part of this weight is carried by the wheels, with the result that the end to be attached to the tractor may carry a substantial proportion of the total weight. A jack, a block and tackle attached to some elevated point, or several strong men are required to perform the operation of lifting the end of the elevator from the ground and connecting it to the draw bar of a tractor. This operation is very difficult and should the jack slip, the tackle break or one of the men lose his grip or footing, the results are likely to be extremely serious by reason of the partly raised end of the elevator suddenly dropping to the ground.

Furthermore, the setting up of suitable equipment and tackle for the purpose of effecting a hitch is expensive and time consuming, and unnecessary work is performed in this operation if it is attempted by manual labor only.

It is an object of the present invention to provide a simple apparatus by means of which the end of a farm implement may be connected to the draw bar of a tractor and subsequently lifted by means of mechanical advantage to a position at which the implement may be safely and readily attached to the draw bar and easily drawn away from its position of rest.

A further object is to provide an apparatus for performing the above-mentioned functions which may be permanently attached to the chassis of the vehicle with which it is to be used, which is simple and compact in construction, dependable in operation, and requires minimum upkeep.

The novel features that I consider characteristic of my invention are set forth in the appended claims. The invention, itself, however, both as to its organization and method of accomplishment, together with additional objects and advantages thereof will best be understood from the following description of a specific embodiment when read in conjunction with the accompanying drawings, in which:

Fig. 1 is a perspective view of the end of a portable elevator adjacent to the rearwardly extending end of a draw bar of a tractor, with a device constructed according to the present invention in position for connecting the two vehicles, and with the end of the elevator on the ground preparatory to being raised to a position in which it may be attached to the draw bar and the tractor may effectively move it from place to place.

Figure 1:
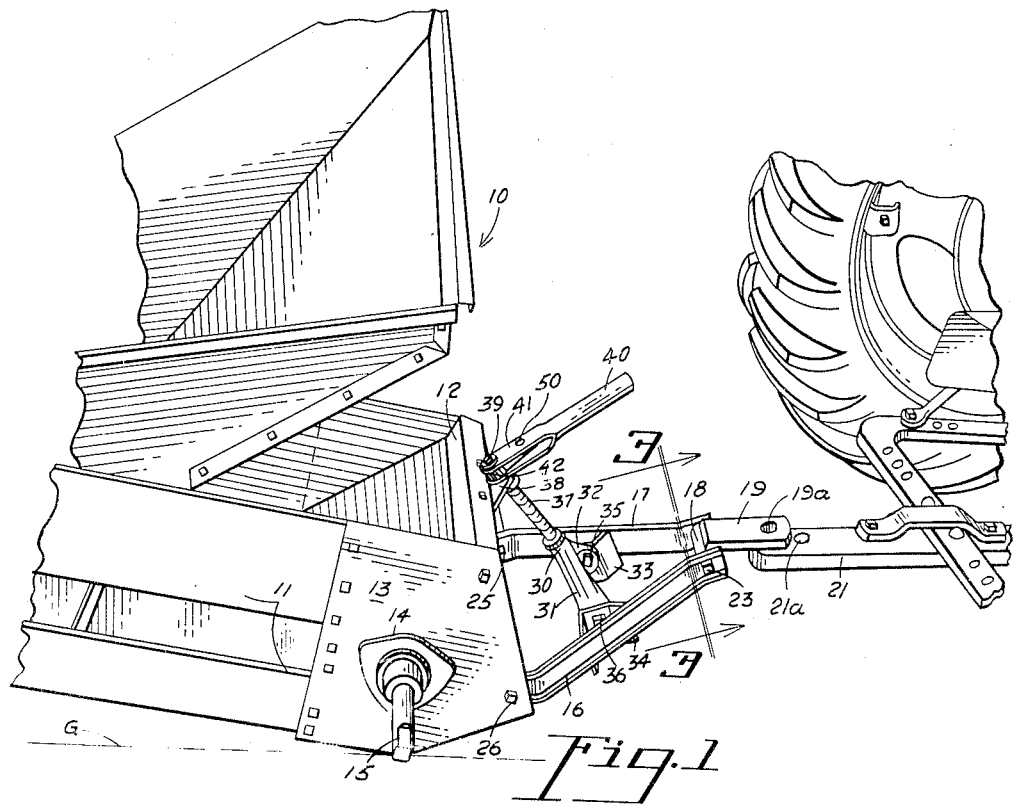
Figure 3:
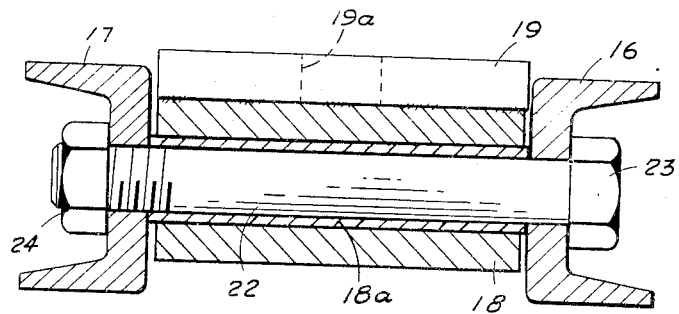
Fig. 3 is an enlarged section taken along the line 3—3 of Fig. 1 showing one of the horizontal pivots of the device.

In the drawings, an elevator generally designated as 10 is shown as comprising longitudinal frame members 11 and transverse frame members 12 at the front end thereof. In the illustrative device these frame members are reinforced and connected by side plates 13, each containing a bearing 14 in which a shaft 15 is journaled for the purpose of driving the elevator mechanism. The actual drive of the elevator forms no part of the present invention and is not shown in the drawings.

Extending forwardly from the front end of the elevator and pivotally secured to each side plate 13 at 25 and 26 are two arms 16 and 17 converging toward a sleeve 18 pivotally mounted between the ends of the arm. The sleeve 18 may comprise a simple forging having a horizontal member 19 formed integrally therewith, in the end of which is an aperture 19a through which a pin 20 (Fig. 2) may be inserted to register with a complementary aperture 21a in the end of the draw bar 21. Sleeve 18 is mounted for rotation about bushing 18a.

In the above construction it will be apparent that the pin 20 will act as the vertical pivot of the hitch while the bushing 18a through which is extended a bolt 22 having a head 23 and the end of which is secured by a nut 24, will act as the horizontal pivot of the hitch. These pivots permit relative movement between the tractor and the drawn vehicle in a manner well known in the art.

Secured intermediate of 16 and 17 by brackets 33 and 34 is an internally threaded block 30 comprising two arms 31 and 32 each pivotally secured to one of the brackets by means of horizontal pivots 35 and 36 which may consist of simple bolts. The shank portion of block 30 is internally threaded to receive an externally threaded shaft 37, the end of which is journaled in suitable bearings (not shown) in a bracket 38 secured to the upper cross frame member 12 of the elevator. The outermost end 39 of shaft 37 is conveniently provided with a polygonal cross section over which the interior hub of a ratchet wheel 42 is removably secured.

Figure 4:
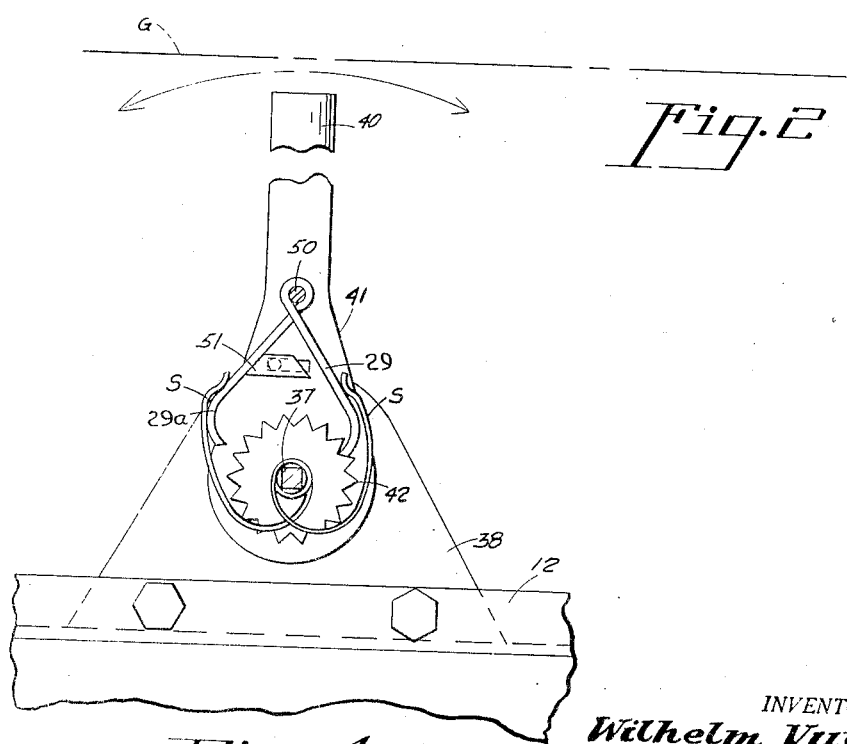
Fig. 4 is an enlarged view, partly in section, of the actuating lever of the device showing an arrangement permitting the operating shaft of the lifting mechanism to be rotated in a selected direction.

As will be observed in Fig. 4, the ratchet wheel 42 is journaled in the bifurcated end 41 of a lever 40. A pair of ratchet pawls 29 and 29a may be mounted on pin 50 within the bifurcated end 41 for selective engagement with the ratchet teeth of wheel 42. Spring S positioned as shown in Fig. 4 may be arranged so that one pawl may be rendered inoperative by sliding stop 51 against it in a manner well known in the art.

It will be understood that the lever assembly 40 is arranged so that it may be removed and stored in a convenient place in or adjacent the elevator and that when in use the internal diameter of the ratchet wheel 42 is simply slipped over the polygonal end 39 of shaft 37 so that the shaft 37 may be turned by movement of arm 40 in one direction through the action of one of the pawls on the ratchet wheel 42. When the stop 51 is moved to its other position, movement of the arm in the other direction will allow the other pawl to engage the ratchet teeth for rotation of wheel 42 in the other direction.

Thus rotation of shaft 37 in a selected direction may be accomplished by adjusting the sliding stop 51 to render one of the pawls inoperative.

Figure 2:
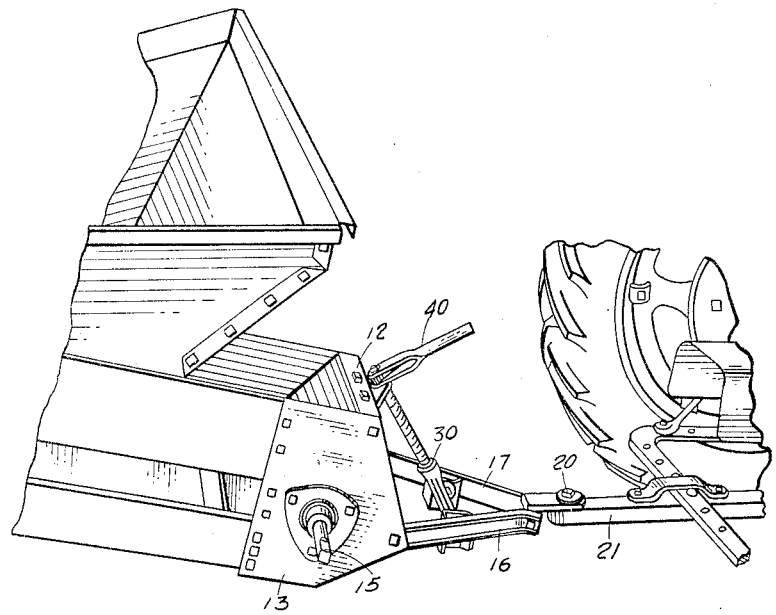
Fig. 2 is a perspective of the same vehicle showing how the device of the present invention may be actuated to lift the front end of the elevator from the ground and apply the weight thereof on to the tractor.

The operation of the device is understood from a comparison of Figs. 1 and 2. Fig. 1 shows the position of the front end of the elevator as it rests upon the ground, ground line G being drawn parallel to and in the plane of the side plate 13 nearest the observer. The tractor is backed up to a position adjacent the front end of the elevator and the lever 40 rotated in a direction so that the shaft 37 is screwed into the block 30. During this operation the distal end of the hitch unit is rotated about a horizontal axis comprising pivots 25 and 26 and is raised to a point where the lower edge of plate 19 is level with the draw bar 21. When this is accomplished, the tractor is simply backed into a position in which the aperture 21a in the draw bar may be aligned with the aperture 19a in plate 19 and pin 20 dropped in place.

Sliding stop 51 is now shifted to render the other pawl inoperative and arm 40 is now rotated in the opposite direction in order to extend the shaft 37 and screw it out of the block 30. During the operation the hitch rotates about the pivot 22 and the end of the elevator is raised. The mechanical advantage provided by the lifting arrangement permits the heavy elevator to be thus raised about pivot 22 by one man who simply effects adjustment of the proper spring pressed pawl and oscillates the arm 40 of the lift, the weight of the front end of the elevator being transferred to the draw bar and thence to the chassis of the tractor.

Having thus described my invention, I claim:

1. In combination with a farm implement which during normal operation has one end resting on the ground which said end is adapted to be raised and releasably secured to a draft device to permit transportability, a hitch and ratchet apparatus comprising a pair of spaced arms pivotally secured at independent points to the end of the farm implement, said arms converging at their ends remote from the end of the farm implement, a bearing bushing rigidly secured to the convergent ends of said arms, a sleeve rotatably supported by said bushing, said sleeve having a portion thereof extending therefrom and formed to define an aperture for engagement with complementary means provided on the draft device, an internally threaded block comprising a pair of diverging legs each of which is pivotally secured to one of said arms intermediate its ends, a threaded shaft, the lower end of said threaded shaft engaging said threaded block and the upper end being rotatably mounted at the end of said farm implement above the points at which said arms are pivotally secured thereto, and a removable reversible ratchet handle for selectively rotating said shaft in a clockwise or counterclockwise direction for swinging said arms relative to the farm implement.

2. In a farm implement having an end adapted to be raised and releasably secured to a draft device to permit transportability, a hitch apparatus comprising a pair of spaced arms pivotally attached to the end of said farm implement, said arms converging at their extended ends, a sleeve rotatably secured between said extended ends, said sleeve having a portion thereof extending therefrom for attachment to said draft device, an internally threaded block comprising a pair of diverging legs, each of which legs is pivotally secured to one of said arms intermediate its ends, a threaded shaft, one end of said threaded shaft engaging said threaded block and the other end being rotatably mounted at the front end of said implement, and removable reversible means for selectively rotating said shaft in a clockwise or counterclockwise direction for swinging said arms relative to said farm implement.

WILHELM VUTZ.

REFERENCES CITED

The following references are of record in the file of this patent:

UNITED STATES PATENTS

| Number | Name | Date |
|---|---|---|
| 1,775,297 | Towner | Sept. 9, 1930 |
| 2,141,781 | Allen | Dec. 27, 1938 |
| 2,327,308 | Johnston | Aug. 17, 1943 |
| 2,328,343 | Jacob | Aug. 31, 1943 |

FOREIGN PATENTS

| Number | Country | Date |
|---|---|---|
| 517,300 | Great Britain | Jan. 25, 1940 |
| 742,679 | France | Mar. 14, 1933 |